United States Patent Office 3,169,973
Patented Feb. 16, 1965

3,169,973
TRISORGANOPHOSPHORUS COMPOUNDS AND A METHOD OF PREPARING THEM
Karoly Szabo, Yonkers, N.Y., assignor to Stauffer Chemical Company, New York, N.Y., a corporation of Delaware
No Drawing. Filed Oct. 25, 1961, Ser. No. 147,447
6 Claims. (Cl. 260—326)

This invention relates to organophosphorus compounds and, in particular, to trisorganophosphorus esters of the type produced by reacting an acylated amide of trichloromethanesulfenic acid with esters of phosphorus acids. The invention also pertains to pesticidal compositions particularly fungicides, insecticides, germicides and the like containing as the active component thereof at least one of the aforesaid trisorganophosphorus esters and to methods of preparing, using and applying such compositions. The novel organophosphorus compounds as contemplated herein, can be considered as amide derivatives of methanesulfenamide and are characterized by the presence of an $>N-S-C\equiv$ linkage in which the nitrogen contains at least one acyl group and the carbon contains three phosphoric ester groups. The basic configuration of these patently new entities are represented by the following formulae:

(I)

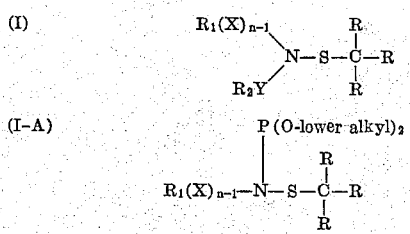

(I-A)

$$P(O\text{-lower alkyl})_2$$
$$R_1(X)_{n-1}-N-S-\overset{R}{\underset{R}{C}}-R$$

wherein X and Y which may be alike or different, each designate an acyl radical, $R_1$ and $R_2$ represent organic radicals or when joined together can constitute a cyclic ring system and R designates a phosphoric ester group as exemplified by phosphoryl and phosphonyl radicals and $n$ is an integer of from 1 to 2 it being understood that $n$ is always 2 when $R_1$ and $R_2$ are joined together. A phosphoric ester group as employed herein designates or refers generally to any organophosphorus ester in which phosphorus exists in its higher valence state, i.e. its pentavalent state. It is to be understood that the term acyl refers to organic groupings identified by the following structural features:

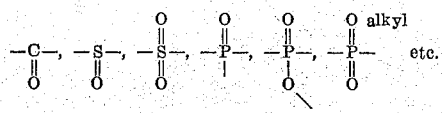

The above defined chemical groupings are recognized in the chemical arts and their definition may be found in any of the numerous chemical treatises and, in this connection, reference is made to Hackh's Chemical Dictionary, 2nd edition.

As previously pointed out, $R_1$ and $R_2$ constitute organic radicals and can be illustrated by a wide variety of groups. We have, for instance, ascertained that $R_1$ and $R_2$ can comprise either aliphatic or carbocyclic systems wherein the number of carbon atoms vary from about 2 and extending upward in the neighborhood of 30. It has been our finding that excellent biological activity is exhibited by those derivatives in which $R_1$ and $R_2$ are selected from lower aliphatic groups such as a lower alkyl radical etc. methyl, ethyl, n-propyl, n-butyl, sec-butyl, isobutyl etc.; an unsaturated group such as allyl, methallyl, propargyl, n-butenyl, propenyl and the like; a cycloalkyl group e.g. cyclopentyl, cyclohexyl and the like; an aromatic hydrocarbon radical of the benzene and naphthalene series which may or may not contain substituents in the ring as illustrated by a phenyl radical, an α-naphthyl group, a β-naphthyl group and the like; an aralkyl group preferably of the type wherein the aryl portion belongs to the benzene or naphthalene series and in which the alkyl portion is a lower alkyl grouping, e.g. phenylmethyl, phenethyl, 3-phenylpropyl, 3-α-naphthylpropyl etc.; a hetero cyclic group particularly those constituting a monocyclic or a bicyclic system in which the ring contains 5 to 6 atoms as exemplified by the pyridine series, furane series, thiophene series, quinoline series, thiazole series, isoquinoline series and the like and together $R_1$ and $R_2$ may constitute a 5 to 6 membered cyclic ring system which can be provided with single substituents or fused on ring systems such as benzo, naphtho and the like. As stated elsewhere herein, the R radicals of Formula I are ester groupings of the type exemplified by phosphoryl and phosphonyl groups and can be illustrated by the following general formulae:

(II)

and (III)

wherein $R_3$ refers to a lower aliphatic radical, preferably a lower alkyl group such as methyl, ethyl, n-propyl, n-butyl, sec-butyl, isobutyl and the like and $R_4$ represents an organic radical as exemplified by a lower aliphatic group such as a lower alkyl as above, a lower unsaturated group such as allyl, methylallyl, propargyl, etc.; a cyclic alkyl group as cyclopentyl, cyclohexyl, etc.; an aromatic hydrocarbon radical which may or may not contain ring substituents as illustrated by a phenyl group, naphthyl groups and the like and aralkyl and hetero cyclic groups as above defined for $R_1$ and $R_2$.

It is to be pointed out that compounds falling within the ambit of Formula I can be a mono-N-acyl derivative when $n$ is equal to 1 in which case the resulting compound is a N-acylmethanesulfenamide. On the other hand, when $n$ is equal to 2, the resulting structure is an N,N-diacylmethanesulfenamide or more properly an imide. As has already been stated, such imide structures can be of the open chain type in which case $R_1$ and $R_2$ are separate radicals or, on the other hand, the imides may embrace a cyclic structure as when $R_1$ and $R_2$ are joined to form a cyclic ring system of the type exemplified by a phthalimide nucleus.

Structures which are illustrative of compounds subsumed by the general configuration of Formula I can be depicted as follows:

COMPOUND 1

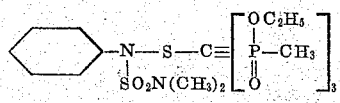

COMPOUND 2

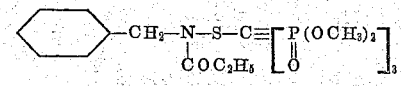

COMPOUND 3

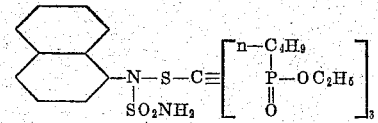

COMPOUND 4

$$\text{C}_6\text{H}_{11}\text{-CH}_2\text{-CH}(\text{CH}_3)\text{-N}(\text{SO}_2\text{C}_2\text{H}_5)\text{-S-C}\equiv[\text{P}(\text{OCH}_3)_2(\text{=O})]_3$$

COMPOUND 5

$$\text{C}_6\text{H}_{11}\text{-N}(\text{COCH}_3)\text{-S-C}\equiv[\text{P}(\text{CH}_3)(\text{OC}_2\text{H}_5)(\text{=O})]_3$$

COMPOUND 6

(hexamethylcyclohexyl)–N(COCH$_3$)–S–C≡[P(OCH$_3$)$_2$(=O)]$_3$

COMPOUND 7

$$\text{N}(\text{COCH}_3)_2\text{-S-C}\equiv[\text{P}(\text{C}_6\text{H}_{11})(\text{OC}_2\text{H}_5)(\text{=O})]_3$$

COMPOUND 8

(tetrahydrophthalimido)–S–C≡[P(OC$_2$H$_5$)$_2$(=O)]$_3$

COMPOUND 9

(succinimido)–S–C≡[P(OC$_2$H$_5$)$_2$(=O)]$_3$

COMPOUND 10

$$\text{C}_6\text{H}_{11}\text{-N}(\text{SO}_2\text{CH}_3)\text{-S-C}\equiv[\text{P}(\text{OC}_2\text{H}_5)_2(\text{=O})]_3$$

COMPOUND 11

(tetrahydrophthalimido)–S–C≡[P(C$_6$H$_{11}$)(OC$_2$H$_5$)(=O)]$_3$

COMPOUND 12

(pyridyl)–N(COC$_2$H$_5$)–S–C≡[P(OC$_2$H$_5$)$_2$(=O)]$_3$

COMPOUND 13

(thiazolyl)–N(COCH$_3$)–S–C≡[P(OCH$_3$)$_2$(=O)]$_3$

COMPOUND 14

(hexamethylcyclohexyl substituted decalinyl)–N(COCH$_3$)–S–C≡[P(OC$_2$H$_5$)(=O)]$_3$

COMPOUND 15

$$\text{(dichlorocyclohexyl)-N}(\text{SO}_2\text{CH}_3)\text{-S-C}\equiv[\text{P}(\text{OC}_2\text{H}_5)_2(\text{=O})]_3$$

COMPOUND 16

$$\text{H}_{10}\text{C}_5\text{-N}(\text{COCH}_3)\text{-S-C}\equiv[\text{P}(\text{C}_2\text{H}_9)(\text{OCH}_3)(\text{=O})]_3$$

COMPOUND 17

(hexahydrophthalimido)–N–S–C≡[P(OC$_2$H$_5$)$_2$(=O)]$_3$

COMPOUND 18

(hexahydrosulfonyl lactam)–N–S–C≡[P(OC$_2$H$_5$)$_2$(=O)]$_2$

COMPOUND 19

(dichlorocyclohexyl)–N(SO$_2$CH$_3$)–S–C≡[P(OC$_2$H$_5$)$_2$(=O)]$_3$

COMPOUND 20

(decalinyl)–N(SO$_2$CH$_3$)–S–C≡[P(OCH$_3$)(=O)]$_3$

COMPOUND 21

(decalinyl-succinimido)–N–S–C≡[P(OCH$_3$)(=O)]$_3$

COMPOUND 22

$$\text{C}_6\text{H}_{11}\text{-CO-C}[\text{=P(OC}_2\text{H}_5)_2(\text{=O})]\text{-N(CO)-S-C}\equiv[\text{P}(\text{OC}_2\text{H}_5)_2(\text{=O})]_3$$

COMPOUND 23

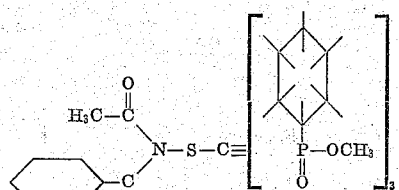

COMPOUND 24

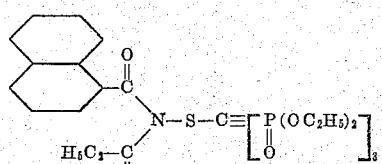

COMPOUND 25

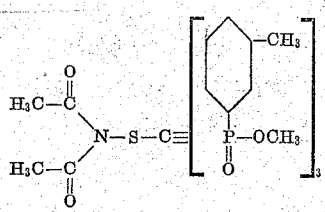

COMPOUND 26

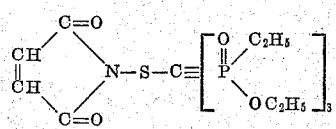

The compounds of the invention can be prepared by condensing an acylated trichloromethanesulfenamide with a phosphorous ester, i.e. an ester in which the phosphorus is trivalent in accordance with the following generalized equation:

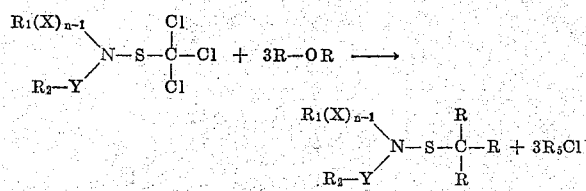

wherein $R_5$ is lower alkyl and $R$, $R_1$, $R_2$, $X$, $Y$ and $n$ have previously been defined. The reaction is desirably carried out in a relatively inert organic solvent using approximately 3 moles of the phosphorous ester and 1 mole of the acylated trichloromethanesulfenamide. It is to be understood, however, that such proportions are only approximate and may be altered or modified to suit particular situations. In carrying out the reaction, we have found it convenient to add the phosphorous ester to the trichloromethanesulfenamide. When the components are mixed in the aforedescribed manner, an extremely vigorous and exothermic reaction ensues which is unexpected since the reaction of organophosphorus esters with other halogenated derivatives is not spontaneous and, in fact, the normal practice requires refluxing of the two components for some time in order to effect or complete the reaction. At the present time we are unable to account for such increased activity but it is conjectured that the high electro-negativity of the acyl groupings may be an important factor. This suggestion, however, is only tentative and is not to be construed as imposing or placing any limitation on the invention.

Solvents which are suitable for carrying out the reaction are preferably of the relatively inert organic variety and include such members as are normally liquid at room temperature as exemplified by paraffinic and aromatic hydrocarbons including their liquid derivatives, aliphatic saturated ethers and the like.

The acylated trichloromethanesulfenamides which are used as starting materials in preparing the compounds of this invention are known intermediates, the description and preparation of which is given in the chemical literature. In general they are prepared by dissolving the requisite amide or imide in an aqueous alkaline solution to which is added a slight excess of perchloromethylmercaptan. The resulting trichloromethanesulfenamide derivatives can be isolated and purified by the usual methods.

The phosphorous esters are also known entities and their description and preparation can be found by resorting to the chemical journals and the patent literature.

In order to spell out more clearly the various processes and products described herein, reference is now made to the following examples. However, these examples are inserted for the purpose of illustration only and those skilled in the art will appreciate that various modifications and ramifications of the invention can be practiced without departing from the spirit or scope thereof.

*Example 1*

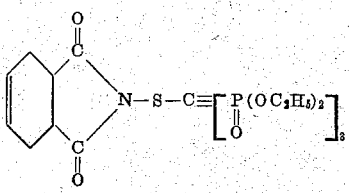

30.1 g. (0.1 M) of N-(trichloromethyl-thio)-tetrahydrophthalimide was suspended in 100 ml. of chloroform to which was introduced triethylphosphite in small portions until a total of 0.3 M had been added. The reaction was exothermic and the temperature of the mixture rose to the reflux (61° C.) during the initial introduction of the triethylphosphite. After the reaction had subsided a 5 gram excess of phosphite ester was added, after which the mixture was treated with charcoal and filtered. The solvent and any excess triethylphosphite were removed under reduced pressure leaving a residue amounting to 58 g. of a yellow oil having a refractive index of 1.4783. The crude oil was purified by dissolving in 200 ml. of benzene and the solvent solution washed twice with 200 ml. portions of water. The benzene layer was dried over anhydrous magnesium sulfate, after which the solvent was distilled off. The residue was a bright yellow oil, the refractive index of which was 1.4741.

*Example 2*

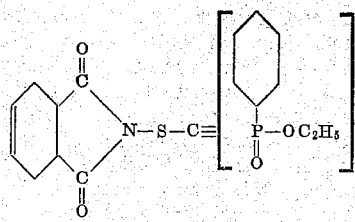

The general procedure as given under Example 1 was carried out using 15.05 g. (0.05 M) N-(trichloromethyl-thio)-tetrahydrophthalimide, 100 ml. benzene and 29.7 g. of a diethylphenylphosphonite. The temperature of the reaction was maintained below 60° C. using external cooling and, after a reaction period of 15 minutes, chilled overnight in a refrigerator. The solvent was then removed under reduced pressure leaving a red viscous oily residue, having a refractive index of 1.5654.

*Example 3*

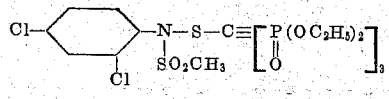

The procedure as outlined in Example 1 was carried out using 19.5 g. (0.05 M) of N-(trichloromethylthio)-N-(2,4-dichlorophenyl)-methane-sulfonamide, 25.5 g. of triethylphosphite and 100 ml. of benzene. The reaction was exothermic and, in general, the resulting yields paralleled those of the previous examples. The product was a bright yellow oil obtained in a yield of about 90% having a refractive index of 1.4900.

*Example 4*

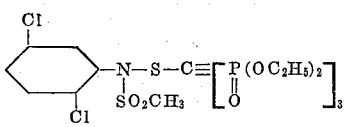

This example utilizes the procedures as above described and the reactants consisted of equivalent proportions of N-(trichloromethylthio) N-(2,5-dichlorophenyl)-methane sulfenamide and triethylphosphite. The product was a yellow oil, the refractive index of which was 1.4938.

*Example 5*

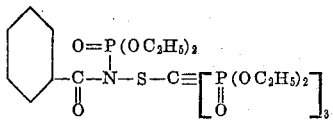

Using 4.5 g. (0.001 M) of N-benzoyl-N-diethylphosphoryltrichloromethanesulfenamide

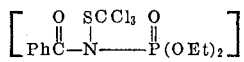

and 5.5 g. (0.033 M) of triethylphosphite, the procedure as given in the prior examples was repeated. The results and yields were in consonance with the results of the previous examples. In this instance, the reaction product was obtained as a viscous brown oil.

In realizing the optimum biocidal activity of the herein contemplated compounds, it is desirable that they be formulated with suitable adjuncts. Thus pesticidal compositions can be conveniently prepared in the form of liquids or solids, the latter preferably as homogeneous free-flowing dusts commonly formulated by admixing the active component with finely divided solids or carriers as exemplified by talc, natural clays, diatomaceous earth, various flours such as walnut shell, wheat, soya bean, cotton seed and so forth.

Liquid compositions are also useful and normally comprise a dispersion of the toxicant in a liquid media. For instance, it may be convenient to dissolve the toxicant directly in a solvent such as xylene, alkylated naphthalenes or the like and use such organic solutions directly. However, it is more common procedure to employ dispersion of the toxicant in an aqueous media and such compositions may be produced by forming a concentrated solution of the toxicant in a suitable organic solvent followed by dispersion in water, usually with the aid of surface active agents. The latter, which may be the anionic, cationic or nonionic types, are exemplified by sodium stearate, potassium oleate and other alkali metal soaps and detergents such as sodium lauryl sulfate, sodium naphthalene, sulfonate, sodium alkyl naphthalene sulfonate, methyl cellulose, polyoxyethylene, fatty alcohol ethers, polyglycol fatty acid esters and other polyoxyethylene surface active agents. The preparation of these agents commonly comprises 1–15% by weight of the pesticidal compositions although the proportion is not critical and may be varied to suit any particular situation.

Other adjuncts may be resorted to in compounding biocidal formulations based on the herein described organophosphorus esters and, in this connection, reference is made to adhesives, spreaders, activaters, fertilizers and the like. The preparation of pesticidal compositions incorporating the organophosphorus esters of this invention and the results of testing such compositions are spelled out in the following test procedures:

*Acaricidal evaluation test.*—The two-spotted mite, *Tetranychus telarius* (Linn.) is employed in tests for acaricides. Young Pinto bean plants are infested with several hundred mites. Dispersions of test compounds are prepared by dissolving 0.1 gram of the toxic material in ten milliliters acetone. This solution is then diluted with water containing 0.015% Vatsol (sodium salt of isopropylnaphthalene sulfonate) and 0.005% Methocel (methylated cellulose) as emulsifiers, the amount of water being sufficient to give concentrations of active ingredient ranging from 0.25% to 0.005%. The test suspensions are then sprayed on the infested Pinto bean plants. After seven and fourteen days, the plants are examined both for post-embryonic forms of the mite as well as eggs. The percentage of kill is determined by comparison with control plants which have not been sprayed and the LD–50 value calculated using well-known procedures. LD–50 values are reported under the columns "2 SM" and "2 SM eggs" on Table I.

*Insecticidal evaluation tests.*—Four insect species are subjected to evaluation tests for insecticides:

(1) American cockroach (AR) *Periplaneta Americana* (Linn.)
(2) Milkweed bug (MWB) *Oncopeltus Fasciatus* (Dallas)
(3) Confused flour beetle (CFB) *Tribolium confusum* (Duval)
(4) House fly (HF) *Musca domestica* (Linn.)

The procedure for insects is similar to the miticidal testing procedure. Test insects are caged in cardboard mailing tubes 3⅛" in diameter and 2⅝" tall. The cages are supplied with cellophane bottoms and screened tops. Ten to twenty-five insects are used per cage. Food and water are supplied in each cage. The confused flour beetles are confined in petri dishes without food. The caged insects are sprayed with the active compound at various concentrations. After twenty-four and seventy-two hours, counts are made to determine living and dead insects.

House fly evaluation tests differ in this respect: the toxicant is dissolved in a volatile solvent, preferably acetone, the active compound is pipetted into a petri dish bottom, allowed to air dry and placed in a cardboard mailing tube. Twenty-five female flies are caged in the tube. The flies are continuously exposed to the known residue of the active compound in the cage. After twenty-four and forty-eight hours, counts are made to determine living and dead insects. The LD–50 values are calculated using well-known procedures, and reported in the table below.

TABLE I

| Compound | House Fly | American Roach, percent | Milkweed Bug, percent | Confused Flour Beetle, μg. | Two-Spotted Mite, percent | Two-Spotted Mite percent |
|---|---|---|---|---|---|---|
| 11 | .1% | 0 | 0 | 0 | 0 | |
| 15 | 100 μg | >.1 | >.1 | <100 >50 | .06 | .06 |
| 19 | 100 μg | >.1 | .1 | <50 >10 | .06 100 | .06 100 |
| 22 | 100 μg | .1 | .1 | 0 | .06 | .06 |

I claim:
1. An organophosphorus amide selected from the class consisting of

$$\begin{array}{c} R_1(X)_{n-1} \\ \phantom{R_1(X)_{n-1}} \diagdown \\ \phantom{R_1(X)_{n-1}}\phantom{X} N-S-\underset{\underset{R}{|}}{\overset{\overset{R}{|}}{C}}-R \\ \phantom{R_1(X)_{n-1}} \diagup \\ R_2Y \end{array}$$

and

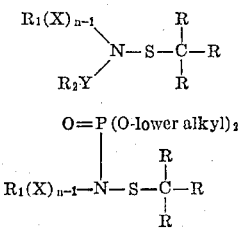

wherein R is selected from the class consisting of

and

wherein $R_3$ represents lower alkyl and $R_4$ is selected from the class consisting of lower alkyl and phenyl, and X and Y represent acyl groupings selected from the class consisting of

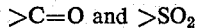

$R_1$ and $R_2$ are selected from the class consisting of lower alkyl and phenyl while taken together $R_1$ and $R_2$ represent a hydrocarbon residue selected from the class consisting of benzo and ethylene, and $n$ is an integer of from 1 to 2, it being understood that $n$ is always 2 when $R_1$ and $R_2$ are taken together.

2. An organophosphorus ester of the formula:

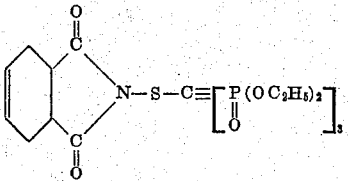

3. An organophosphorus ester of the formula:

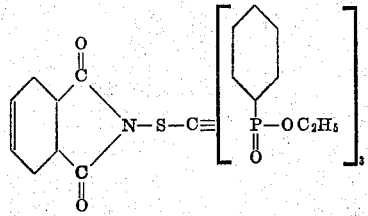

4. An organophosphorus ester of the formula:

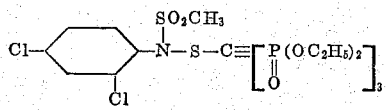

5. An organophosphorus ester of the formula:

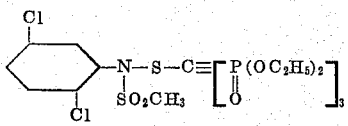

6. An organophosphorus ester of the formula:

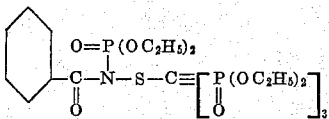

References Cited in the file of this patent
UNITED STATES PATENTS

| | | |
|---|---|---|
| 2,244,547 | Horst | June 3, 1941 |
| 2,269,272 | Krefft | Jan. 6, 1942 |
| 2,566,992 | Morgan et al. | Sept. 4, 1951 |
| 2,713,058 | Kittleson | July 12, 1955 |
| 2,813,819 | Birum | Nov. 19, 1957 |
| 2,995,568 | Malz et al. | Aug. 8, 1961 |

OTHER REFERENCES

Bergmann: The Chemistry of Acetylene and Related Compounds, page 80, Interscience Publishers Inc., N.Y. (1948).

Pudovik: J. Gen. Chem. USSR, vol. 27, pages 2375–87 (1957).

Handbook of Chem. and Physics, 37th ed., Chemical Rubber Publishing Co., Ohio, 1955, p. 354.

UNITED STATES PATENT OFFICE
CERTIFICATE OF CORRECTION

Patent No. 3,169,973                                      February 16, 1965

Karoly Szabo

It is hereby certified that error appears in the above numbered patent requiring correction and that the said Letters Patent should read as corrected below.

Column 1, lines 50 to 54, the right-hand formula should appear as shown below instead of as in the patent:

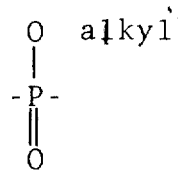

column 5, lines 42 to 45, the formula should appear as shown below below instead of as in the patent:

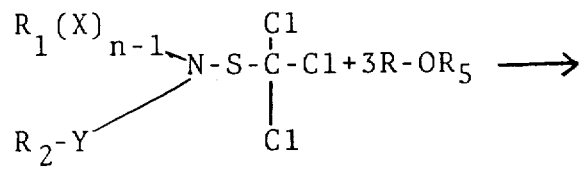

column 8, Table I, heading to the seventh column thereof, after "Mite" insert -- Eggs, --; same Table I, seventh column, and opposite Compound 11, insert -- 0 --.

Signed and sealed this 27th day of July 1965.

(SEAL)
Attest:

ERNEST W. SWIDER                                      EDWARD J. BRENNER
Attesting Officer                                   Commissioner of Patents